No. 666,491. Patented Jan. 22, 1901.
C. A. BURT.
LABELING MACHINE.
(Application filed Jan. 23, 1897.)
(No Model.) 6 Sheets—Sheet 1.
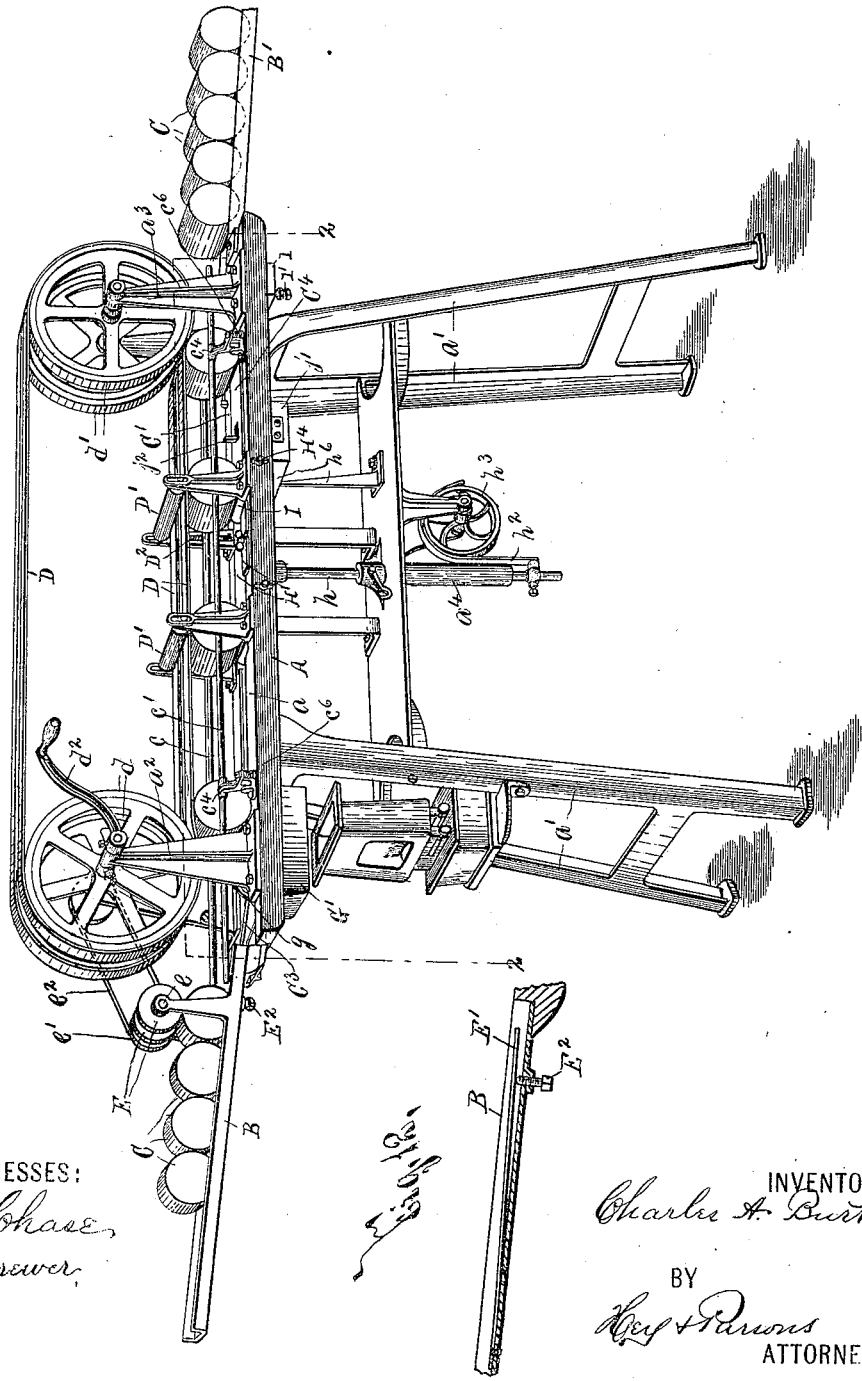
WITNESSES:
H. E. Chase
J. F. Brewer
INVENTOR
Charles A. Burt,
BY
Hey & Parsons
ATTORNEYS.

No. 666,491. Patented Jan. 22, 1901.
C. A. BURT.
LABELING MACHINE.
(Application filed Jan. 23, 1897.)
(No Model.) 6 Sheets—Sheet 2.
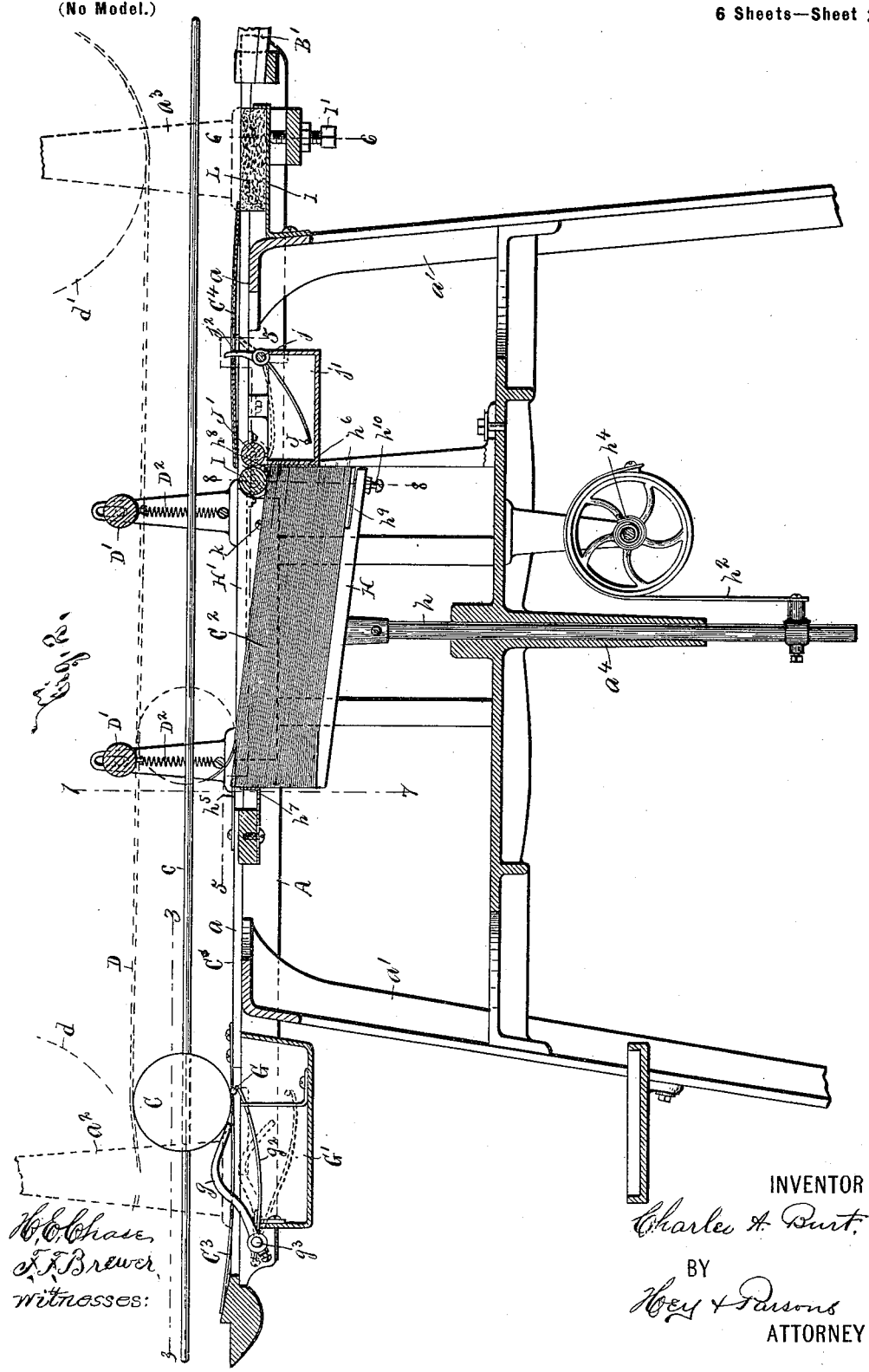
INVENTOR
Charles A. Burt.
BY
Hey & Parsons
ATTORNEYS.

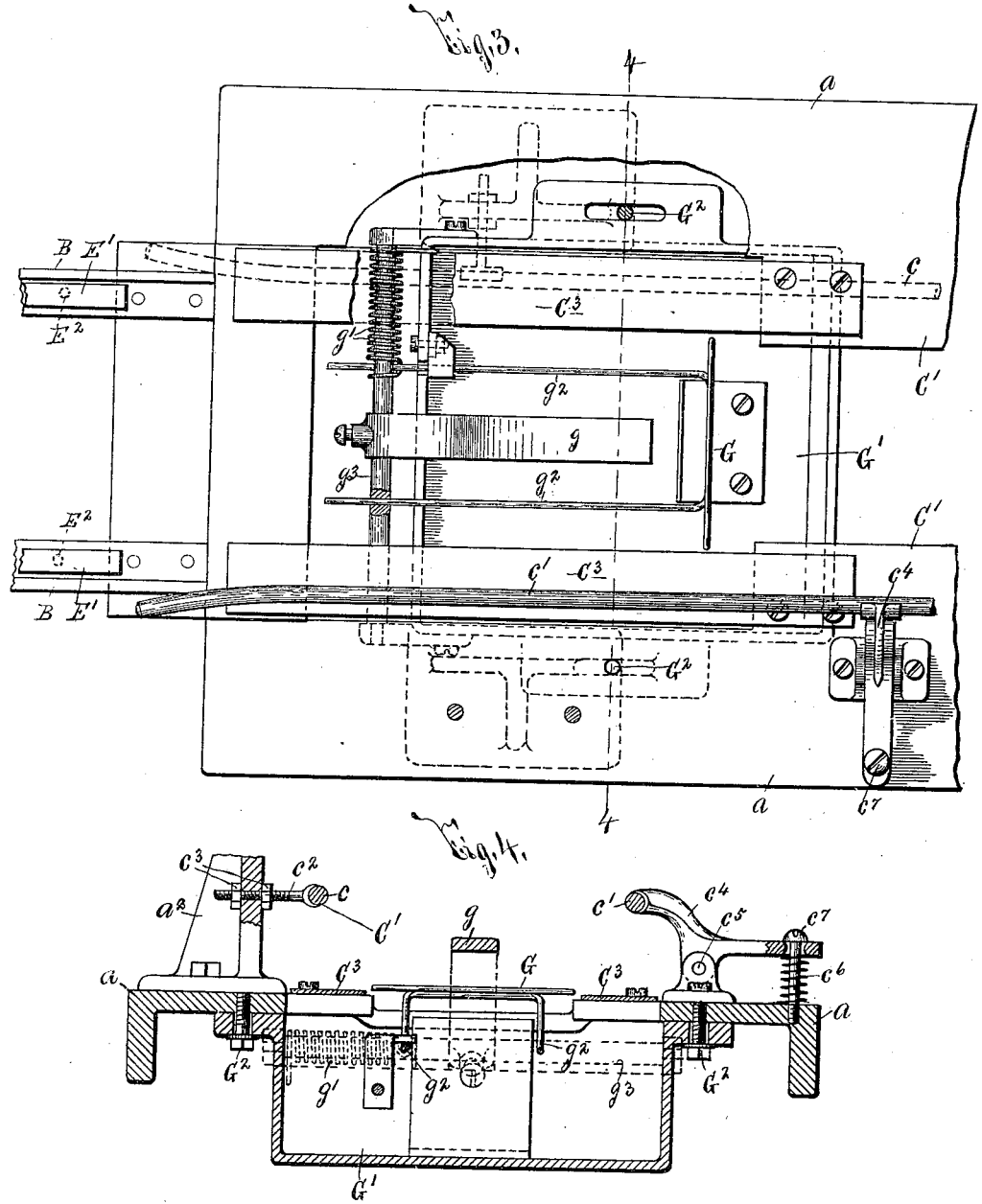

No. 666,491. Patented Jan. 22, 1901.
C. A. BURT.
LABELING MACHINE.
(Application filed Jan. 23, 1897.)
(No Model.) 6 Sheets—Sheet 4.
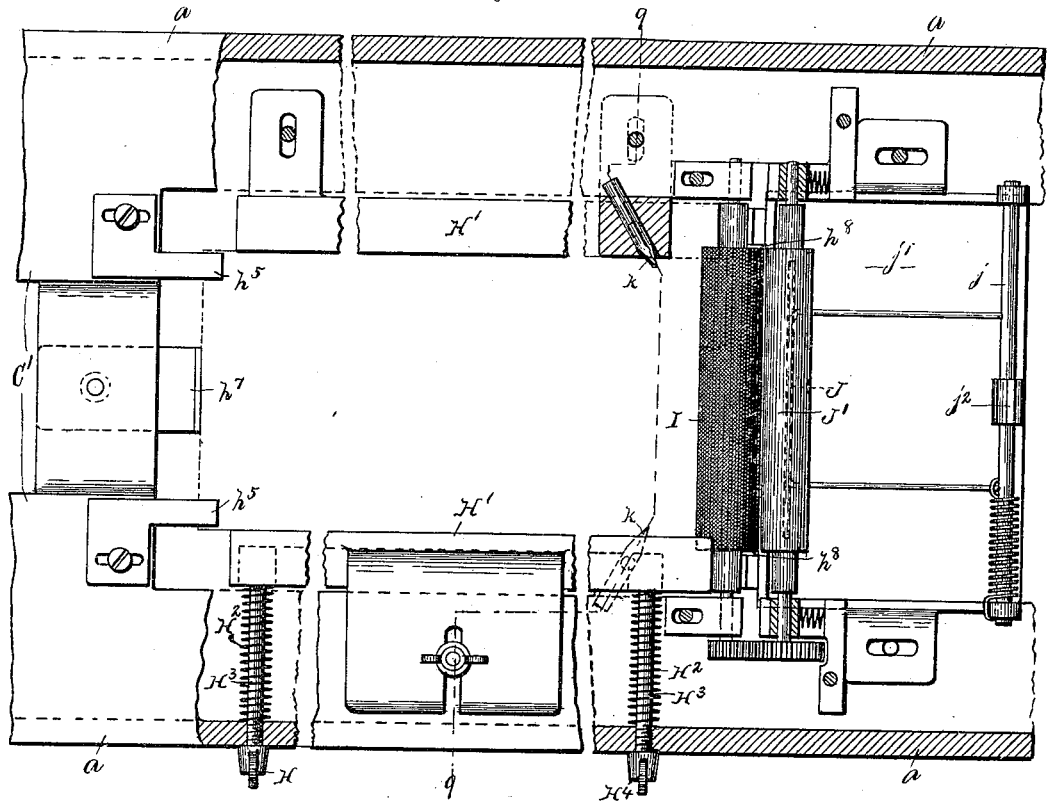
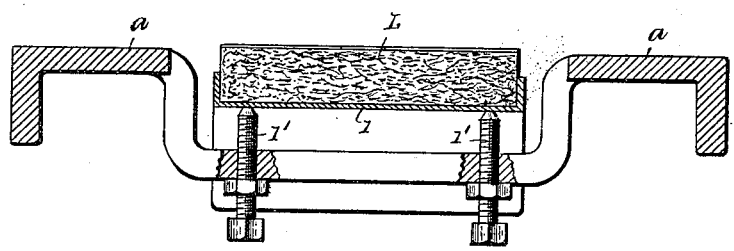
WITNESSES:
H. E. Chase
F. F. Brewer
INVENTOR
Charles A. Burt,
BY
ATTORNEYS.

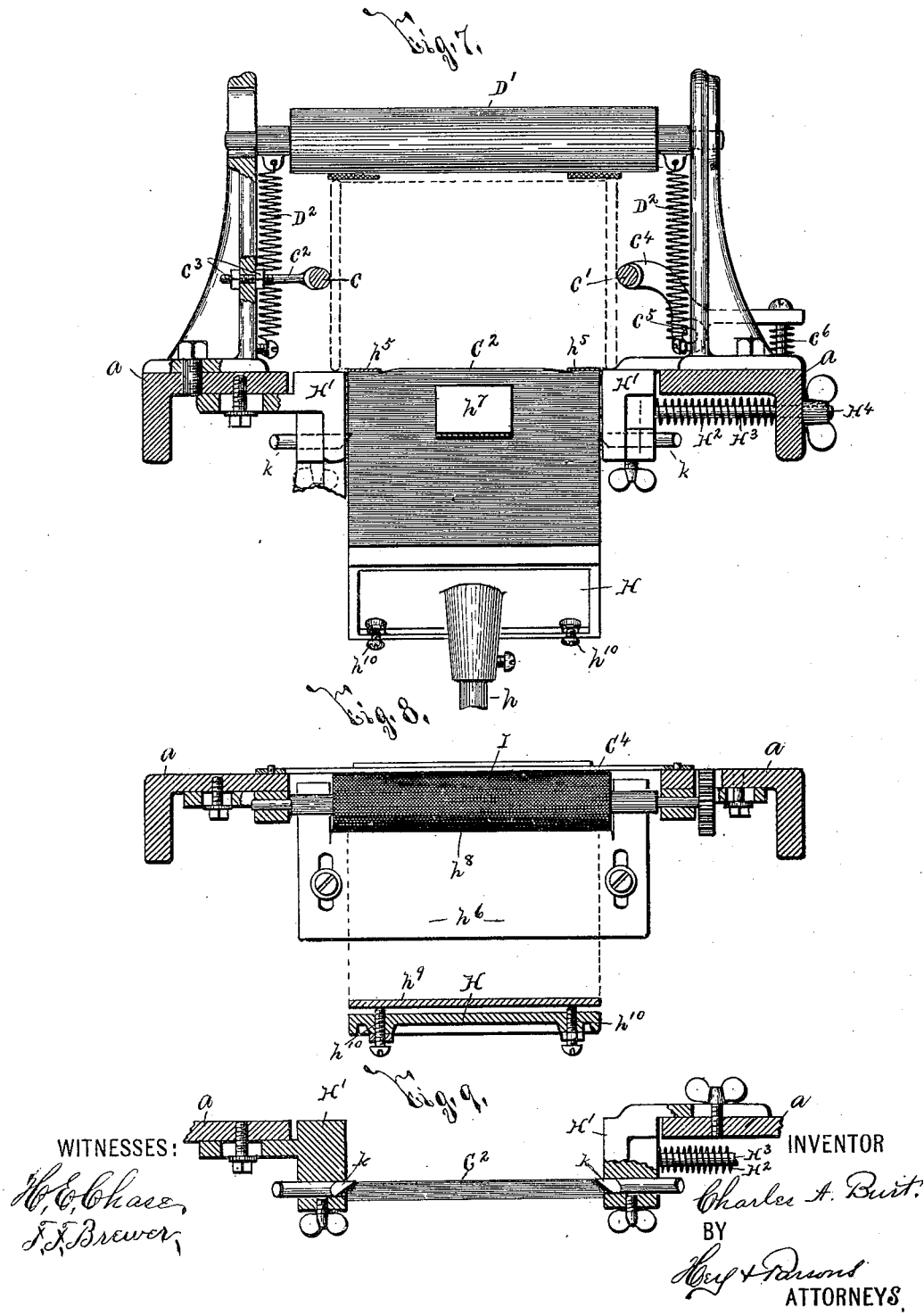

No. 666,491. Patented Jan. 22, 1901.
C. A. BURT.
LABELING MACHINE.
(Application filed Jan. 23, 1897.)
(No Model.) 6 Sheets—Sheet 6.
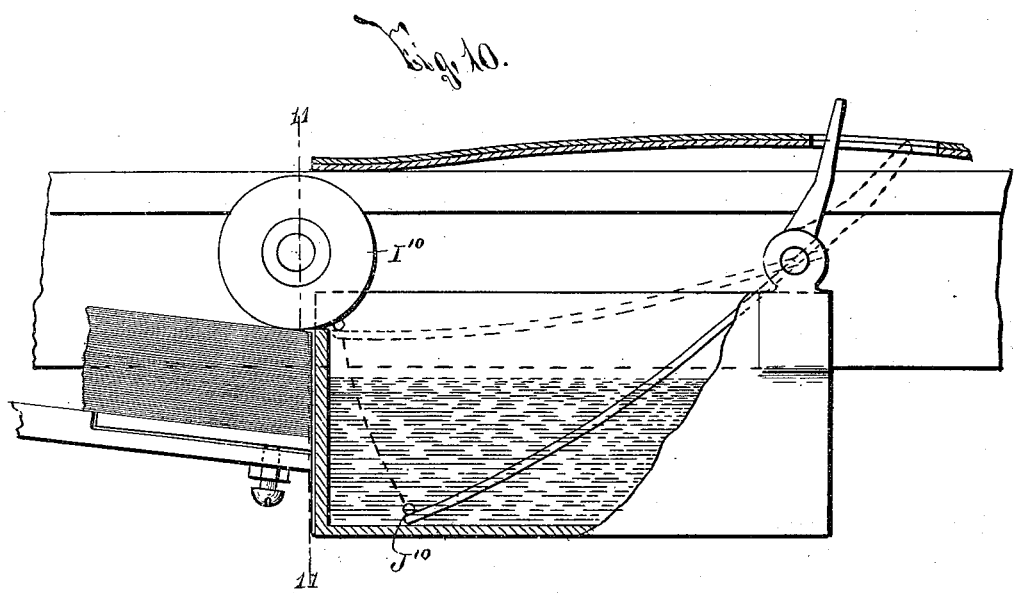
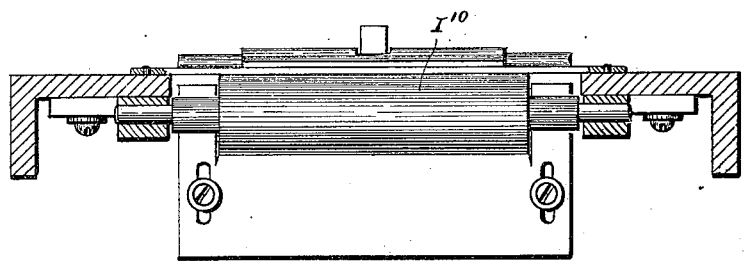
WITNESSES:
INVENTOR
Charles A. Burt
BY
Hey & Parsons.
ATTORNEYS.

UNITED STATES PATENT OFFICE.

CHARLES A. BURT, OF BALTIMORE, MARYLAND, ASSIGNOR TO THE BURT LABELING MACHINE COMPANY, OF SAME PLACE.

LABELING-MACHINE.

SPECIFICATION forming part of Letters Patent No. 666,491, dated January 22, 1901.

Application filed January 23, 1897. Serial No. 620,347. (No model.)

*To all whom it may concern:*

Be it known that I, CHARLES A. BURT, of Baltimore, in the State of Maryland, have invented new and useful Improvements in Labeling-Machines, of which the following, taken in connection with the accompanying drawings, is a full, clear, and exact description.

My invention relates to improvements in labeling-machines, and has for its object the production of a device which is particularly efficient and durable in operation; and to this end it consists, essentially, in the general construction and arrangement of the parts of a labeling-machine, all as hereinafter more particularly described, and pointed out in the claims.

In describing this invention reference is had to the accompanying drawings, forming a part of this specification, in which like letters indicate corresponding parts in all the views.

Figure 1 is a perspective view of my improved labeling-machine, illustrating the general construction and arrangement of its component parts. Fig. 2 is a longitudinal vertical section taken on line 2 2, Fig. 1, a portion of the feeding means for the cans or other articles and the supports therefor being indicated by dotted lines. Figs. 3 and 4 are horizontal and vertical sections taken, respectively, on lines 3 3 and 4 4, Figs. 2 and 3, one of the guide rails or bars being indicated by dotted lines in Fig. 3. Figs. 5 and 6 are horizontal and vertical sections taken, respectively, on lines 5 5 and 6 6, Fig. 2. Figs. 7, 8, and 9 are transverse vertical sections taken, respectively, on lines 7 7 and 8 8, Fig. 2, and 9 9, Fig. 5. Fig. 10 is a longitudinal vertical section of a slightly-modified construction of the means for applying paste to the rear ends of the labels. Fig. 11 is a transverse vertical section taken on line 11 11, Fig. 10, and Fig. 12 is a longitudinal vertical section taken on line 12 12, Fig. 3.

A is the frame of the labeling-machine, B B' chutes for conveying the cans or other articles C to and from a guide or way C', supported by the frame A, and D the means for feeding the cans or other articles through the guide or way C'.

The frame A consists of a table $a$ and legs $a'$, of suitable form, size, and construction, and the chutes B B' incline, respectively, toward and away from the guide or way C', which is arranged above the top face of the table $a$ and is provided with guide rails or bars $c\,c'$, Figs. 1, 2, 3, 4, and 7. The rail or bar $c$ is secured to the adjacent ends of longitudinally-movable arms $c^2$, projecting laterally therefrom and having their opposite ends adjustably fixed by nuts $c^3$ to uprights or standards $a^2$, rising from the table $a$. The rail or bar $c'$ is fixed to automatically movable supports $c^4$, which are pivoted at $c^5$ to suitable supports and are engaged by springs $c^6$ for yieldingly forcing said rail or bar toward the cans or other articles passing along the guide or way $c'$. The springs $c^6$, Fig. 4, preferably encircle adjustable pins or rods secured to the table $a$ and provided with heads $c^7$ for limiting the rocking movement of the supports $c^4$.

The means D for feeding the cans or other articles in their passage along the guide or way C' may also be of any desirable form, size, or construction, but preferably consists of an endless belt supported above the guide or way C' and passing over pulleys $d\,d'$, the shafts of which are journaled in the uprights or standards $a^2\,a^2$, previously mentioned, and oppositely-arranged uprights or standards $a^3\,a^3$. The feeding means or belt D is actuated by any suitable power-transmitting mechanism, as a crank $d^2$, secured to the shaft or spindle of one of the pulleys $d\,d'$, and is so arranged that its lower portion is disposed substantially parallel with the base of the guide or way C' and operates to frictionally engage and feed the cans or other articles fed to said guide or way by the chute B.

The operation of the feeding means or belt D is facilitated by rollers D', which are engaged with the top face of the lower portion of said means or belt for forcing the same toward the cans or other articles, are preferably free to move vertically, and are drawn downwardly by suitable springs $D^2$, Figs. 2 and 7, connected thereto.

It is extremely desirable to regulate the feeding of the cans or other articles within the guide or way C' in order that the labels $C^2$ may be applied with the desired efficiency.

This result is preferably effected by separated feeding-wheels E, which are arranged above the chute B for engaging the opposite ends of the cans or other articles and operate to feed the same forward to the guide or way C' at less speed than the feeding means or belt D feeds said cans or other articles through the guide C'. The feeding-wheels E are mounted on a shaft e, which is provided with a pulley $e'$, connected by a belt $e^2$ to the shaft or spindle of the pulleys d. Suitable springs E' are arranged within the chute B in the path of movement of the cans or other articles and operate to force said cans or other articles toward the wheels E. The position and operation of the springs E' may be varied by adjusting-screws $E^2$.

The cans or other articles C fed by the wheels E to the guide or way C' are forced toward the feeding means or belt D by suitable spring bars or plates $C^3$ in the base of said guide and encounter and depress beneath their path an arm $g$, Figs. 2, 3, and 4, projecting upwardly into said path. This arm actuates a suitable cement-applying piece G, which is normally forced into operative position by a spring $g'$, Fig. 3, and is preferably mounted on a yielding arm $g^2$, arranged normally beneath the path of the cans. The spring $g'$ preferably encircles a rocking pin or rod $g^3$, and the arms $g$ $g^2$ are usually fixed to said rod, although they may be otherwise connected, if desired. The cement-applying piece G is movable into and out of the cement contained within a suitable receptacle G', which is secured in position by any suitable fastening means, as bolts $G^2$, Figs. 3 and 4, and is adjustable toward and away from the follower H, presently described, for supporting the labels to be applied to the cans. The supports for the rocking pin or rod $g^3$ are preferably fixed to the walls of said receptacle G', and consequently the cement-applying piece G is adjustable toward and away from the label-supporting plunger in order that the cement may be applied to the cans at the desired point.

$G^3$ is a shelf projecting from the legs $a'$ and situated directly under the cement-receptacle G'.

$G^4$ is a lamp (shown only in Fig. 1) which is seated on the shelf $G^3$, the flame of which serves to heat and liquefy the cement in the said receptacle, and thereby adapt it for application to the can by means of the cement-applying piece G.

In using a cement which is liquefiable by heat for the attachment of the front ends of labels to cans a better adhesion is obtained, for the reason that there is no time required to dry the adhesive, and the cooling and hardening of the cement take place almost immediately after the application thereto of the label.

The preferred base of the heat-liquefied cement which I use is rosin, and as that substance is brittle when cold and liable when in that state to become detached from a highly-polished metallic surface I increase its plasticity and adhering properties preferably by the addition of, say, twenty-five per centum of petrolatum or vaseline, a product of petroleum. This compound, which is practically a solid at ordinary temperatures, is readily melted and in that condition easily applied to a can-body and forms a satisfactory adhesive.

The follower H, previously mentioned, supports a number of labels $C^2$, arranged one above the other, is secured to a vertically-movable follower-rod $h$, and is formed with a top face inclined downwardly from its end nearest the chute B. This follower is so arranged in relation to the previously-described parts of my invention that when a can has been completely revolved after the application of cement thereto by the applying-piece G its cemented surface encounters and adheres to the elevated end of the uppermost label upon said support. The follower-rod $h$ is movable in any suitable guide $a^4$ and is connected by a flexible strap $h^2$ and a wheel $h^3$ to a spring $h^4$ for normally elevating the follower H. The wheel $h^3$ is of considerable diameter, and the spring $h^4$ is connected to the hub and shaft of said wheel, and consequently a slight movement of the spring effects a greater movement of the follower. A stop-roller I engages the depressed end of the uppermost label $C^2$ and limits the upward movement of the follower H, and, as will be presently described, a paste-applying piece J operates to feed paste to said roller in order that the lapped ends of the label may be secured together.

The labels $C^2$ upon the follower H are movable between adjustable guide-pieces H', suitably secured to the table $a$. One of these guide-pieces when being adjusted is yieldingly forced against the labels by springs $H^2$, which encircle rods $H^3$, provided with adjustable shoulders $H^4$, for varying the tension of said springs. Undue upward movement of the advance end of the uppermost label is obviated by yielding stops $h^5$, Fig. 5, resting thereupon, and endwise movement of the labels is prevented by suitable stops $h^6$ $h^7$, one of which supports a scraper $h^8$ for engaging the roller I and preventing the passage of an undue amount of paste thereto. The rear or depressed ends of the labels $C^2$ may be adjusted vertically by a movable plate $h^9$, supported by the follower H and engaged by an adjusting-screw $h^{10}$.

Upon the engagement of the cemented surface of a can C with the elevated end of the uppermost label $C^2$ said label adheres to the can and is wrapped thereupon as the can is revolved. During this operation the roller I temporarily holds the rear end of said label in position and somewhat strains or stretches the same for preventing the formation of wrinkles. The engagement of the roller I with the rear end of the uppermost label also prevents the disarrangement of said label, and this result is facilitated by oppositely-arranged knives $k$, Figs. 2, 5, and 9, which are preferably secured to the guide-pieces H' and rest upon the opposite edges of the uppermost label in proximity to the stop-roller I. As the passing can revolves the knives $k$ readily cut through the label engaged therewith before its disengagement from the roller I and immediately engage the underlying label for preventing its disarrangement as the overlying label is withdrawn from the roller I and operates to partially revolve said roller.

The paste-applying piece J, previously mentioned, is mounted on a rocking pin $j$ and is movable in a suitable receptacle $j'$, the end wall of which supports the stop $h^6$, also previously mentioned. An arm $j^2$ is secured to the rocking pin $j$ and projects upwardly into the path traversed by the cans after the application of the label thereto. This arm is depressed by the passing cans, thus rocking the shaft $j$ and elevating the paste-applying piece J into operative position. The paste-applying piece J is preferably movable into contact with a feeding-roller J', which is driven from the stop-roller I through the medium of the gear-wheels $J^2$ (see Fig. 5) and is in contact with the stop-roller I and distributes the paste thereupon; but, if desirable, the paste-applying piece may directly engage the stop-roller, and at Figs. 10 and 11 I have shown a slightly-modified form of my invention in which a stop-roller $I^{10}$ is engaged by a paste-applying piece $J^{10}$.

Immediately after the passage of a can beyond the plunger H and the disengagement of the rear end of its adhering label from the roller I spring-plates $C^4$ in the base of the guide or way C' yieldingly force said can toward the feeding means or belt D and firmly press the adhering label into any indentation or irregularity in the surface of the can. These spring-plates, although simple in construction and operation, are an important feature of my invention, as their operation adds greatly to the efficiency of the machine. As the can revolves so that the lapped ends of its label are adjacent to the base of the guide or way C' it engages a yielding pad L, which is interposed between the rear ends of the spring-plates $C^4$ and the chute B' and firmly presses said lapped ends together. This pad L is mounted on a movable support $l$ and is forced toward the belt D by a suitable adjuster, as a bolt $l'$.

In the operation of my improved labeling-machine the cans or other articles are admitted to the chute B and are fed to the guide or way C' by the wheels E. The feeding means D feeds the cans or other articles through the guide or way C' at increased speed, and during the onward movement of a can or other article a suitable amount of liquefied cement is applied thereto by the cement-applying piece G. The advance end of the uppermost label upon the follower H is then engaged by the portion of the advancing can or other article to which the liquefied cement has been applied, and as the can continues its onward movement said uppermost label is wrapped thereupon and is considerably strained or stretched owing to the engagement of its rear end by the roller I. The straining or stretching of the label prevents wrinkling thereof, and as the can or other article continues its onward movement the paste-applying piece J is operated and the springs $C^4$ and pad L firmly press the label in position upon said can or other article.

The operation of my invention will now be readily understood upon reference to the foregoing description and the accompanying drawings, and it will be particularly noted that the labels are firmly pressed into any indentation or irregularity in the surface of the can.

Having thus fully described my invention, what I claim as new, and desire to secure by Letters Patent, is—

1. In a labeling-machine, the combination of a guide or way, means for engaging the cans or other articles and feeding the same through the guide or way, means for applying the label to the cans or other articles, and a spring-plate supported at its opposite ends and having its central portion movable vertically toward said means for forcing the labels into inequalities in the surface of the cans or other articles, substantially as and for the purpose set forth.

2. In a labeling-machine, the combination of a guide or way, means for engaging the cans or other articles and feeding the same through the guide or way, means for applying the label to the cans or other articles, a spring-plate supported at its opposite ends and having its central portion movable vertically toward said means for forcing the labels into inequalities in the surface of the cans or other articles, and a yielding pad for engaging the cans or other articles and pressing together the lapped ends of the labels, substantially as and for the purpose described.

3. In a labeling-machine, the combination of a guide or way for the passage of the cans or other articles, a follower for supporting a series of labels, whereby the pasted cans or other articles engage one end of the uppermost label, a stop-roller supported above the opposite end of said label for engaging the upper face thereof, and an oscillating paste-applying piece for feeding the paste to the stop-roller, substantially as and for the purpose specified.

4. In a labeling-machine, the combination of a guide or way for the passage of the cans or other articles, a follower for supporting a series of labels, whereby the cemented cans or other articles engage one end of the uppermost label, a normally-fixed stop-roller supported above the opposite end of said label for engaging the upper face thereof, a movable paste-applying piece for feeding the paste to the stop-roller, and an arm projecting into the path of the cans or other articles and connected to the paste-applying piece for automatically bringing the same into operative position, substantially as and for the purpose set forth.

5. In a labeling-machine, the combination of a guide or way for the passage of the cans or other articles, means for feeding the cans or other articles through the guide or way, means for applying cement to the cans or other articles, a follower for supporting a series of labels, whereby the cemented cans or other articles engage one end of the uppermost label, a stop-roller for engaging the opposite end of said label, a movable paste-applying piece for feeding the paste to the stop-roller, an arm projecting into the path of the cans or other articles and connected to the paste-applying piece for automatically bringing the same into operative position, and a spring-plate having a portion thereof arranged in proximity to said arm and movable vertically toward its feeding means for forcing the cans toward said feeding means when engaged with the arm, substantially as and for the purpose described.

6. In a labeling-machine, the combination of a guide or way for the passage of the cans or other articles, means for feeding the cans or other articles through the guide or way, a follower for supporting a series of labels whereby the cemented cans or other articles engage one end of the uppermost label, a stop-roller supported above the opposite end of said label for engaging the upper face thereof, a movable paste-applying piece for feeding the paste to the stop-roller, an arm projecting into the path of the cans or other articles and connected to the paste-applying piece for automatically bringing the same into operative position, and a spring-plate supported at its opposite ends and having its central portion arranged in proximity to said arm and movable vertically toward and away from the feeding means for forcing the cans toward said feeding means when engaged with the arm, substantially as and for the purpose specified.

7. In a labeling-machine, the combination of a guide or way for the passage of the cans or other articles, a follower for supporting a series of labels, whereby the cemented cans or other articles engage one end of the uppermost label, a stop-roller supported above the opposite end of said label for engaging the upper face thereof, a paste-applying piece movable toward and away from the stop-roller for feeding the paste thereto, and an intermediate feeding-roller interposed between the stop-roller and the paste-applying piece, substantially as and for the purpose set forth.

8. In a labeling-machine, the combination of a guide or way for the passage of the cans or other articles, a follower for supporting a series of labels, whereby the cemented cans or other articles engage one end of the uppermost label, a stop-roller supported above the opposite end of said label for engaging the upper face thereof, a paste-applying piece movable toward and away from the stop-roller for feeding the paste thereto, and a scraper for engaging the roller and preventing undue passage of the paste to the label, substantially as and for the purpose described.

9. In a labeling-machine, a guide or way, mechanism to feed a can along the guide or way, and a support for a label in the path of the moving can, combined with a cement-receptacle, a heater whereby the cement in the said receptacle is retained in a liquefied condition, and means to apply the liquefied cement to the can in advance of its contact with the label, substantially as specified.

10. In a labeling-machine in which a can is rolled along a guide or way and over a label situated in its path, a receptacle for cement, combined with means to heat and liquefy the contained cement, and mechanism whereby the liquefied cement is applied to the can while the same is in motion and before it rolls over the label, substantially as specified.

11. In a labeling-machine, the combination of a guide or way, means to feed a can along the guide or way, a support for a label placed in the path of the moving can, a receptacle for cement secured beneath the path of the moving can, a lamp situated under the said cement-receptacle to heat and liquefy the cement therein, and means to apply the heated cement to the body of the can, substantially as specified.

In testimony whereof I have hereunto signed my name, in the presence of two attesting witnesses, at Baltimore, in the State of Maryland, this 9th day of December, 1896.

CHARLES A. BURT.

Witnesses:
JOHN L. HEBB,
LARKS FISHER.